W. D. Andrews' Impt in Hoisting Apparatus
110331
PATENTED DEC 20 1870
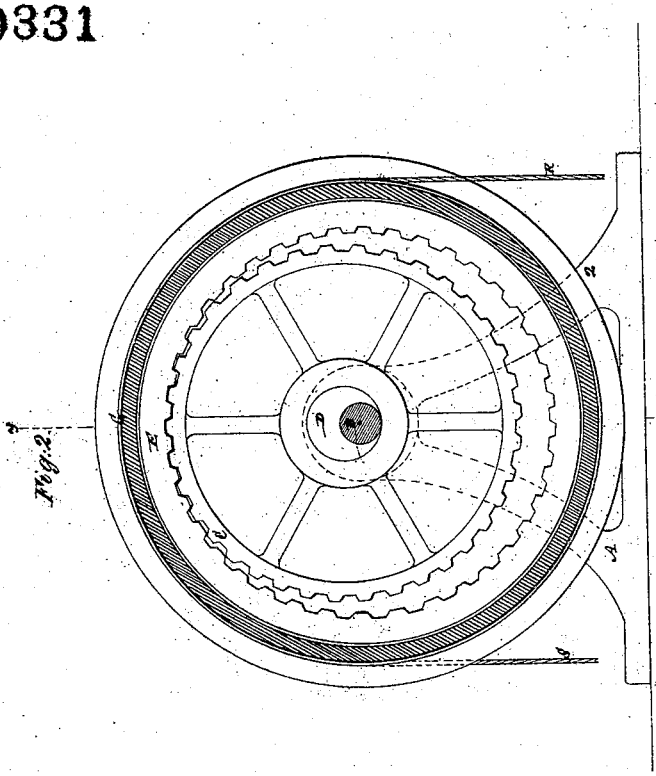
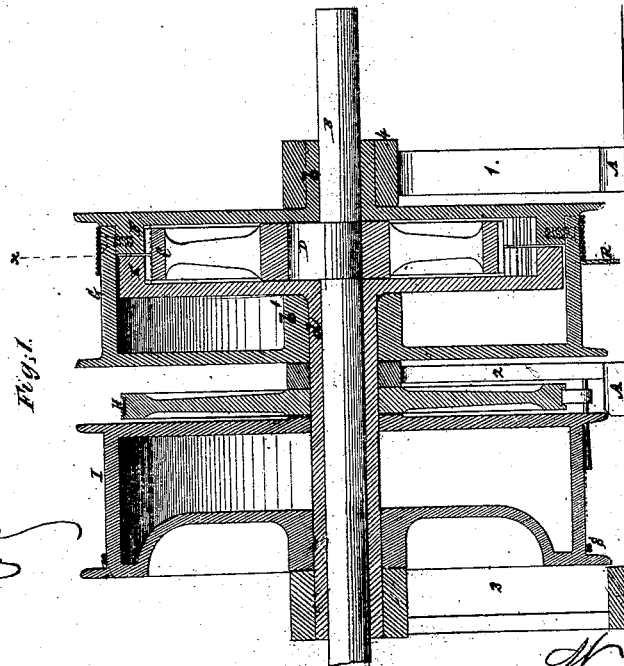

United States Patent Office.

WILLIAM D. ANDREWS, OF BROOKHAVEN, NEW YORK.

Letters Patent No. 110,331, dated December 20, 1870.

IMPROVEMENT IN HOISTING APPARATUS.

The Schedule referred to in these Letters Patent and making part of the same.

*To all whom it may concern:*

Be it known that I, WILLIAM D. ANDREWS, of the town of Brookhaven, in the county of Suffolk and State of New York, have invented a new and useful Improvement in Hoisting Apparatus, of which the following is a full, clear, and exact description, reference being had to the accompanying drawing forming part of this specification, and in which—

Figures 1 and 2 represent sectional elevations, at right angles to each other, of a hoisting apparatus, constructed in accordance with my improvement, said sections being taken as indicated by the lines $x$ $x$ and $y$ $y$, in said figures.

Similar letters of reference indicate corresponding parts.

My invention embraces an internally-geared movable wheel, attached to the inside of a drum, and an internally-geared fulcrum-wheel, of the same diameter at its pitch-line, arranged by the side of the former, and with its center in the same line, said fulcrum-wheel being fast to a hollow shaft, which passes through the center of the drum at one end and forms a bearing for the drum to turn upon, and from thence passes through suitable boxes or bearings, in which it is supported. Connected with this fulcrum-wheel is a brake-wheel for holding the fulcrum-wheel stationary, or for permitting it to revolve, as may be required; also, in some cases, connected with the fulcrum-wheel, is a second drum, for use as hereinafter described.

The opposite end of the first-mentioned drum to that through which the shaft of the fulcrum-wheel passes has a hollow shaft, arranged to turn with it in a suitable box or bearing. The fulcrum-wheel has one or more teeth less or more than the movable wheel. The actuating-wheel of the apparatus is of less diameter, and has one or more teeth less than either the movable or fulcrum-wheel, which teeth are external, and of a breadth equal to those on the movable and fulcrum-wheels combined, into which they mesh simultaneously, tooth for tooth, being carried around within them by a crank or eccentric upon the driving-shaft, said crank or eccentric serving as a bearing for the actuating-wheel to turn upon.

A second fulcrum-wheel may be placed at the other side of the movable wheel, the same being, together with its shaft, bearings, friction-brake wheel, and drum, a duplicate of the hereinbefore-mentioned similar combination, and its shaft forming a bearing for the other end of the main drum to revolve upon. When a second fulcrum-wheel is used, the breadth on the face of the actuating-wheel or pinion is increased to mesh into it simultaneously with the other.

Referring to the accompanying drawing—

A is the foundation-plate or plates, carrying standard-bearings 1, 2, 3.

G is the main drum, to which the weight to be moved is attached by a rope, R.

The drum G has hollow shafts, $b$ $b'$, upon either end, the shaft $b$ revolving in a bearing, 4, and the shaft $b'$ upon the hollow shaft $d$ of a fulcrum-wheel, E. Upon the inner side of the drum G is attached an internally-geared movable wheel F, having, as a given number, by way of example, thirty-five teeth.

The fulcrum-wheel E is also internally geared, and of the same diameter at its pitch-line as the movable wheel F, and has thirty-six teeth. This wheel E is secured to the hollow shaft $d$, which passes through and forms a bearing for the hollow shaft $b'$ of the drum G, thence through the bearings 2, 3. Upon this hollow shaft $d$ are screwed the friction-band wheel H and a second drum, I, to which is attached the rope S.

B is the driving-shaft, having an eccentric, D, upon it, which carries the actuating-wheel or pinion C, on which is external gear, meshing into both movable and fulcrum-wheels E and F. The driving-shaft B passes through and has its bearings in the hollow shaft $b$ of the drum G, and hollow shaft $d$ of the fulcrum-wheel E, on which last-named shaft the friction-band wheel H and drum I are secured, and within which the shaft B freely revolves without stress or strain upon it, except what is required to revolve the actuating-wheel or pinion C.

The brake being applied to the wheel H to hold the fulcrum-wheel stationary, and the weight to be moved attached to rope R, motion is communicated to the shaft B, which causes the periphery of pinion C to move around in contact with the inner periphery of wheels E and F, making one circuit at each revolution of the shaft, the teeth on the pinion meshing simultaneously into the teeth of both the wheels E and F. The wheel E having thirty-six teeth, and being stationary, and the wheel F thirty-five teeth, and free to revolve, at every full circuit of the pinion around the internal periphery of the fulcrum-wheel, the movable wheel is advanced to the extent of the difference between it and the fulcrum-wheel, or one tooth. The number of teeth on the movable wheel being thirty-five, it thus requires thirty-five revolutions of the driving-shaft to communicate one revolution to the drum G, resulting in a thirty-five fold power. The difference in the number of teeth in the fulcrum and movable wheels may be varied to obtain any required difference in power, and either one may have the greater or lesser number, the only difference by such transposition being that the movement will be in a contrary direction.

By my arrangement, when the power is removed from the driving-shaft, no back motion of the wheels can occur, but the weight is held stationary wherever placed, the position of the teeth of the pinion, in a direct line with and between the teeth of the movable and fulcrum-wheels, operating as a perfect pawl or stop so long as the fulcrum-wheel is held stationary.

When it is desired to lower the weight without detaching the power or reversing the motion, it may be done by partially releasing the brake and allowing the fulcrum-wheel to revolve, by which the lowering is easily and effectually controlled.

It being at times desirable to increase the hoisting power of a machine without making a change of gearings, a second drum, I, is provided with a rope, S, which rope being also attached to the same weight to which rope R is connected and the fulcrum-wheel released, both the movable and fulcrum-wheels become movable, and act as fulcrum-wheels each to the other, said drums moving in opposite directions with a velocity equal to one-half that attained when one is held stationary, and the drums being of the same size, the power is doubled.

By making the second drum of less diameter than the first, the power will be further increased in proportion to one-half the difference in diameter of the two drums, or the double power may be reduced by increasing the size of the second drum.

When more than one drum is used, the weight can only be lowered by reversing the motion of the gearing. When heavy weights are to be raised, it is desirable to use a second fulcrum-wheel upon the opposite side of the movable wheel, the same being a perfect fac simile of the one shown, with similar shaft, friction-band wheel, drum, and bearings, and the face of the pinions being widened sufficiently to mesh into all the wheels simultaneously. When one fulcrum-wheel only is used, the pressure upon the two ends of the teeth in the actuating-pinion being in opposite directions, a twisting strain results around the center of the tooth as a fulcrum, which is counteracted by the hub in its bearing upon the crank-pin or eccentric, creating a certain amount of friction thereon. By the use of two fulcrum-wheels this twisting strain upon the tooth is obviated, which is desirable when very heavy weights are to be raised.

The same results may be obtained by reversing the style of wheels, substituting external gear for internal, and internal for external, retaining the same principle of action.

To increase the power when two fulcrum-wheels and three drums are used, a rope is connected to each drum and attached to the weight to be raised, with precisely the same result as when two drums only are used.

To simplify and cheapen the machine, when one given power only is wanted, the drums attached to the fulcrum-wheels and the outer bearings are dispensed with, and if the facility for rapid lowering is not required, the brake-wheels are also dispensed with, and the fulcrum-wheel shaft or shafts, if two are used, are keyed or pinioned in the bearings or otherwise permanently held stationary. By this arrangement the cost of the machine is very much cheapened, and for many purposes has all the qualities required.

What is here claimed, and desired to be secured by Letters Patent, is—

1. The combination, as described, of movable and fulcrum gear-wheels, of the same diameters at their pitch-lines, placed side by side, with their centers in line, the fulcrum-wheel having one or more teeth less or more than the movable wheel, and an actuating-wheel or pinion, carried upon a crank or eccentric attached to a driving-shaft, whose center is coincident with the centers of the movable and fulcrum-wheels, the pinion meshing into the movable and fulcrum-wheels simultaneously, tooth for tooth.

2. The combination with the gearing, as described, of a friction-brake, attached to the fulcrum-wheel, for the purpose of holding it stationary when hoisting, and permitting it to revolve, when required, to admit of the weight being lowered without reversing or stopping the moving power.

3. The two concentric drums, moving in opposite directions, in combination with gearing, substantially as described, for the purpose of increasing the power of the machine, as specified.

WM. D. ANDREWS.

Witnesses:
FRED. HAYNES,
HENRY PALMER.